United States Patent Office 2,898,383
Patented Aug. 4, 1959

2,898,383

DEHYDROCHLORINATION OF TETRACHLORO-ETHANE

Douglas H. Eisenlohr, Barberton, and Robert D. Shelton, Cincinnati, Ohio, assignors to Columbia-Southern Chemical Corporation, Allegheny County, Pa., a corporation of Delaware No Drawing. Application August 27, 1958
Serial No. 757,447

9 Claims. (Cl. 260—654)

The present invention deals with the production of trichloroethylene from symmetrical tetrachloroethane, and more particularly is concerned with an improved catalytic process for consummating such conversion.

Vaporized symmetrical tetrachloroethane can be converted to trichloroethylene at elevated temperatures of 900° F. to 1000° F. Operation at these temperatures is not always advantageous. It is further possible to dehydrochlorinate tetrachloroethane by reaction with an alkali such as calcium hydroxide. Such procedure precludes direct recovery of by-product hydrogen chloride evolved in the conversion.

The present invention obviates the disadvantages of manufacturing trichloroethylene at unusually high reaction temperatures and/or the loss of by-product hydrogen chloride which accompanies alkaline dehydrochlorination of tetrachloroethane. In the present invention, vaporized symmetrical tetrachloroethane is converted to trichloroethylene at moderate temperatures, e.g., from 350° F. to 700° F., without chemically binding the by-product hydrogen chloride. Recourse to these more preferred lower temperatures if facilitated by utilization of a solid, gas pervious dehydrochlorination catalyst, the most notable of which is finely divided activated carbon impregnated with barium chloride.

In conjunction with catalytic conversion of vaporized symmetrical tetrachloroethane to trichloroethylene, it has discovered that prolonged catalyst life and overall productivity is provided by limiting the conversion of symmetrical tetrachloroethane to trichloroethylene to well below theoretical. That is, complete or essentially complete dehydrochlorination of symmetrical tetrachloroethane is avoided intentionally. Instead, conversions are intentionally limited to between about 50 and about 85 percent of the tetrachloroethane, with the unconverted balance permitted to pass through the reaction zone unaltered. With higher conversions, say in excess of 90 percent conversion, catalytic productivity declines strikingly.

It has further been discovered that such catalytic process is most effectively operated at or about the minimum temperature at which the catalyst is effective. This prolongs catalyst life and improves catalyst efficiency. Optimum catalyst utilization results.

Practice of the present invention includes converting or dehydrochlorinating vaporized symmetrical tetrachloroethane to trichloroethylene in the presence of a solid, gas pervious dehydrochlorination catalyst at temperatures ranging from 350° F. to 700° F. while intentionally restricting the degree of tetrachloroethane conversion to between 50 and about 85 percent, more ideally between 60 and about 85 percent, of theoretical. In practice, it has been found that the foregoing conditions are most effectively provided by maintaining an essentially constant tetrachloroethane feed to the reaction zone, selecting the minimum temperature and retention time in said zone which will provide for conversion of but 50 to about 85 percent of the tetrachloroethane, analyzing the reaction product mixture to determine the degree of conversion and adjusting the reaction temperature in response to such analysis to restore the degree of conversion within the specified range.

Various procedures may be followed in the preparation of trichloroethylene according to the principles of the present invention. In one, vaporized tetrachloroethane is fed at an essentially constant rate through an elongated tubular reaction chamber packed with finely divided activated charcoal impregnated with barium chloride. At the outset, the rate of feed and temperature in the reaction zone is pre-selected to insure the conversion of but about 50 to about 85 percent of the said tetrachloroethane into trichloroethylene. The feed rate is established to provide for a retention time in the reaction zone of from 5 to 15 seconds. Heat is introduced into the chamber via an external heating means and a maximum reaction zone temperature in the range of 350° F. to 700° F. is established. With fresh catalyst, the temperature and retention time (degree of conversion) are predetermined to admit of minimized temperatures, normally in the range of 350° F. to 450° F.

With continued operation, the effluent stream containing the reaction product and unconverted tetrachloroethane is analyzed periodically or continuously. In response to such analysis, the maximum reaction zone temperature is altered upwardly to insure the 50 to 85 percent conversion. From experience, periodic analysis of the crude reaction composition every 20 to 60 hours is adequate. Such analyses reveal the decreasing degree of conversion achieved, and in response thereto, the maximum temperature developed in the reaction zone is incrementially increased by about 10° F., e.g., 3° F. to 25° F. When the maximum reactor temperature substantially exceeds 700° F., (or is on the order of 675° F. to 725° F.) the reaction is discontinued and fresh or rejuvenated catalyst charged.

By virtue of practicing the foregoing procedure, optimum catalyst utilization and productivity results. Thus, it has been discovered that an optimum or the highest ratio of produced trichloroethylene per pound of catalyst may be achieved by this procedure.

As hereinbefore indicated, reaction zone temperatures ranging from about 350° F. to 700° F. represent the normal operational spread, with temperatures at the lower portion of the range being utilized as the reaction with fresh catalyst is commenced. These then are raised gradually, usually at the rate of from 3° F. to 25° F. for 20 to 60 hours of operation until the reaction zone temperature is about 700° F. Temperatures herein referred to are the maximum reaction zone temperature found by thermocouple readings along the line of flow of gases through the catalyst-containing zone. Some temperature fluctuations in the zone along the line of flow of gases are encountered, but for the purposes of practicing the present invention, control of the maximum temperature in the reaction zone provides adequate results.

Fed to the reaction zone as the sole reactant is symmetrical (1,1,2,2) tetrachloroethane, notably of extreme purity, e.g., 97 percent or higher tetrachloroethane. Absence of ferric chloride is important. In accordance with one of the embodiments of the present invention, a portion of this tetrachloroethane feed is supplied by recovering from the reaction mixture the unconverted tetrachloroethane, purifying it adequately by distillation, or other expedients and recycling it in admixture with fresh tetrachloroethane to the reaction zone. Recycled tetrachloroethane in this embodiment will usually constitute from 15 to 50 percent of the total feed.

This feed may either be prevaporized in a zone physically apart from the reaction zone, or it may be vaporized in that portion in the reaction zone adjacent the point of feed, e.g., the inlet end of a tubular reaction zone. Under preferred conditions, prevaporization of the symmetrical tetrachloroethane is most efficient. With prevaporization, it is expeditious to preheat the tetrachloroethane to just below or at reaction temperature.

It is important in preferred operation that the tetrachloroethane feed rate be maintained essentially constant; that the average retention time of the vapors in the reaction zone be restricted to between 3 and 15 seconds. Within practical operating conditions, the average retention time is maintained essentially constant throughout the operation of a given catalyst bed. Essentially constant within the meaning herein intended means controlling the retention times to limit variations herein to within about 3 seconds. Average retention time, as used here, is a calculated value based upon the volume of the reactor without catalyst and the volume of tetrachloroethane vapors fed per unit of time, at the temperatures and pressures of operation. By dividing the volume of the reaction zone by the volume rate of feed, this average retention time is obtained.

Periodic or continuous analysis of the crude reaction composition is practiced during the course of operation. In its simplest form, this analysis may merely constitute the taking of periodic grab samples of the crude composition and subjecting it to analysis such as infra-red analysis for determination of its tetrachloroethane composition. More usually, infra-red analysis is practiced to determine the trichloroethylene, the perchloroethylene, and the tetrachloroethane percentages in the crude composition. With periodic sampling, it is usually both efficient and practical to sample every several hours, e.g., every 5 or 10 hours, until such time that experience dictates longer time periods suffice. It is often practical to sample only about once a day after continued operation familiarizes the operator with the fluctuations encountered in the particular system under operation.

It will be appreciated that periodic sampling, while both practical and effective, may be replaced by an automatic analytic procedure. This may simply take the form of automatic and continuous infra-red analysis of a bleed stream of the crude composition product. By recourse to electrical and electronic expedients, the continuous analytic technique may be automatically designed to effect the necessary temperature increments in the reaction zone in response to analysis.

Determination of the degree of conversion need not be restricted to sampling the reaction products and analyzing for tetrachloroethane, although this is the preferred practice. It is possible to accomplish similar results by analyzing trichloroethylene, or even evolved by-product hydrogen chloride. Instead of infra-red analysis, other analytic expedients may be employed.

Emanating from the reaction zone is a vaporized mixture including hydrogen chloride, trichloroethylene, unconverted tetrachloroethane and minor quantities of other chlorinated hydrocarbons, the most prevalent of which is perchloroethylene. Resolution of these components into the desired compositions is achieved by any of several expedients. In one, the crude gaseous effluent stream is selectively cooled to condense the organic constituents while leaving the hydrogen chloride as a gas. Once the organics have been selectively condensed, the vaporized hydrogen chloride may be absorbed in water to provide hydrochloric acid of any given concentration.

Once freed of hydrogen chloride, the crude organic composition may be resolved into its component by recognized physical procedures such as distillation. Simple distillation in a plate column, or equivalent fractionating apparatus, will permit the recovery of overhead trichloroethylene from the crude stream. Components boiling above trichloroethylene are accumulated as bottoms in such a distillation. If, as is preferred, the unconverted tetrachloroethane is to be recycled, these bottoms are further purified to remove components such as perchloroethylene, and materials boiling above that of tetrachloroethane such as hexachloroethane or pentachloroethane which also may be present in minor quantities. A series of distillations or fractional distillation may be employed to accomplish this. Thusly purified, this tetrachloroethane is recycled.

The following example demonstrates practice of the present invention:

*Example I*

A reactor consisting of U-shaped tube of nickel pipe having an internal diameter of 2 inches and an overall length of 12 feet (each leg being 6 feet long) was completely surrounded and immersed in a Dowtherm containing chamber. The first leg of the reactor, the inlet end, was packed with ¼ inch Berl saddles and served as a preheating and vaporizing section for tetrachloroethane feed. The second leg of the reactor was packed with 5.4 pounds of finely divided (6 to 8 mesh) activated carbon impregnated with barium chloride and containing 20 percent barium chloride by weight by analysis. The Dowtherm jacket was circulatingly connected with an external leg maintained under vacuum for controlling the Dowtherm boiling temperature. A 110 volt, 2500 watt immersion heater inserted in the external leg and liquid Dowtherm therein provided the heat input control for the Dowtherm heating system, and consequently controlled the reaction temperature in the jacketed reactor.

Essentially pure symmetrical tetrachloroethane was introduced into the preheating and vaporizing Berl saddle packed section of the reactor at 16 pounds per hour. Initially, the maximum reactor temperature was adjusted to 418° F. by controlling the heat input on the immersion heater, the pressure on the Dowtherm and checking the actual temperature within the reaction zone through thermocouples inserted therein. The effluent gas stream emanating from the reactor was cooled by contact with previously condensed organics to separate out as a gas hydrogen chloride. The organics so condensed were then placed in crude product storage system whereafter they were separated by fractional distillation to recover product trichloroethylene and unreacted tetrachloroethane. The latter was at times recycled.

Throughout the operation, samples of crude product, after removal of the hydrogen chloride, were taken periodically, combined every 3 hours, and subjected to laboratory analysis. After periods of about 40 hours of operation, and as indicated by the analysis, the maximum reaction temperature was raised as indicated in the following table to maintain an essentially constant degree of tetrachloroethane conversion. Analysis of the crude composition dictated the degree of temperature change required to maintain this condition.

The following table lists the operational conditions, the periodic temperature changes and the composition of the organic crude product as indicated by the periodic analysis:

| Tetrachloroethane | | Pounds Product | Pounds Trichloro-ethylene | Accumulative Pounds Trichloro-ethylene | Maximum Reaction Temp., °F. | Average Retention Temp., °F. | Average Retention Time (sec.) | Hours Operation | Hours Operation, Cumulative | Percent by Weight Crude Composition | | |
|---|---|---|---|---|---|---|---|---|---|---|---|---|
| Total Feed¹ (pounds) | Fresh Feed (pounds) | | | | | | | | | $C_2HCl_3$ | $C_2Cl_4$ | $C_2H_2Cl_4$ |
| 589 | 428 | 515 | 413 | 413 | 418 | 367 | 9.1 | 40 | 40 | 80.3 | 2.9 | 16.8 |
| 514 | 500 | 424 | 340 | 753 | 421 | 380 | 8.4 | 32 | 72 | 80.3 | 2.9 | 16.8 |
| 689 | 639 | 541 | 435 | 1,188 | 430 | 380 | 8.5 | 44 | 116 | 80.3 | 2.9 | 16.8 |
| 798 | 763 | 639 | 520 | 1,708 | 440 | 382 | 7.9 | 48 | 164 | 81.2 | 2.6 | 16.2 |
| 777 | 715 | 608 | 493 | 2,201 | 454 | 401 | 8.5 | 48 | 212 | 81.2 | 2.6 | 16.2 |
| 693 | 440 | 533 | 435 | 2,636 | 495 | 439 | 9.9 | 44 | 256 | 81.2 | 2.6 | 16.2 |
| 766 | 554 | 596 | 488 | 3,124 | 512 | 458 | 7.5 | 47 | 303 | 81.3 | 3.1 | 15.6 |
| 676 | 693 | 523 | 430 | 3,554 | 522 | 452 | 8.0 | 44 | 347 | 81.8 | 3.1 | 15.6 |
| 774 | 671 | 629 | 514 | 4,068 | 543 | 466 | 7.5 | 48 | 395 | 81.8 | 3.1 | 15.6 |
| 766 | 711 | 616 | 477 | 4,545 | 570 | 481 | 7.5 | 48 | 443 | 77.6 | 2.7 | 19.7 |
| 771 | 712 | 610 | 473 | 5,018 | 598 | 504 | 7.3 | 48 | 491 | 77.6 | 2.7 | 19.7 |
| 775 | 628 | 613 | 475 | 5,493 | 631 | 526 | 7.1 | 48 | 539 | 77.6 | 2.7 | 19.7 |
| 733 | 556 | 612 | 475 | 5,968 | 654 | 546 | 6.2 | 45 | 584 | 77.6 | 2.7 | 19.7 |
| FRESH CATALYST | | | | | | | | | | | | |
| 574 | 524 | 464 | 364 | 364 | 450 | 434 | 7.8 | 36 | 36 | 78.2 | 2.6 | 19.2 |
| 772 | 547 | 611 | 479 | 843 | 475 | 436 | 7.5 | 48 | 84 | 78.2 | 2.6 | 19.2 |
| 760 | 609 | 560 | 438 | 1,281 | 471 | 435 | 8.0 | 48 | 132 | 78.2 | 2.6 | 19.2 |
| 769 | 640 | 623 | 462 | 1,743 | 470 | 433 | 7.8 | 48 | 180 | 74.0 | 1.9 | 24.1 |
| 782 | 645 | 636 | 470 | 2,213 | 474 | 436 | 7.7 | 48 | 228 | 74.0 | 1.9 | 24.1 |
| 755 | 572 | 615 | 455 | 2,668 | 481 | 441 | 7.8 | 47 | 275 | 74.0 | 1.9 | 24.1 |
| 754 | 615 | 591 | 462 | 3,130 | 493 | 454 | 7.9 | 48 | 323 | 78.0 | 2.0 | 20.0 |
| 721 | 566 | 588 | 460 | 3,590 | 495 | 454 | 7.8 | 44 | 367 | 78.0 | 2.0 | 20.0 |
| 759 | 640 | 640 | 492 | 4,082 | 498 | 455 | 7.9 | 48 | 415 | 78.0 | 2.0 | 20.0 |

¹ Difference between total feed and fresh feed was recycled tetrachloroethane.

The results of the first run made in accordance with the above description indicate 10.3 pounds of trichloroethylene produced per hour for a feed rate of 16 pounds per hour of tetrachloroethane over 584 hours of operation. On the average, the organic effluent stream contained 80.3 percent trichloroethylene, 2.8 percent tetrachloroethylene, and 16.9 percent symmetrical tetrachloroethane. This demonstrated an unusually high catalyst productivity, over 1,100 pounds of trichloroethylene per pound of catalyst being produced.

On the other hand, in Table I above, the difference between fresh tetrachloroethane feed and total feed constitutes recycled, purified unconverted tetrachloroethane recovered from the reaction composition.

As the above data indicates, fluctuation in the degree of conversion despite strict control is normal. For brief periods, conversions outside the specified range may be encountered whereupon measures are taken to reestablish and maintain proper conversions. During proper operation, such periods constitute a minor portion of the overall period of operation, amounting to less than about 25 percent and preferably below 10 percent of the time the catalyst charge is in use. Maintaining conversions below about 85 percent is especially important with fresh catalyst, since at conversions above 90 percent for any appreciable time drastically reduces catalyst productability. On the other hand, with exhausted or nearly exhausted catalyst control of conversion is no longer consequential in improving its productivity. Thus, it will be understood it is while the catalyst is active that control of the degree of conversion is material. Catalysts may be regarded as inactive when the conversion of tetrachloroethane to trichloroethylene requires temperatures substantially above about 700° F. or 725° F. and approximating temperatures that thermally will cause appreciable dehydrochlorination.

The general principles herein enunciated with respect to the catalytic conversion of tetrachloroethane to trichloroethtylene is applicable to the use of any recognized dehydrochlorination catalyst operable within the specified temperature ranges. These catalysts are used in the form of finely divided particulated solids, usually being from 3 to 25 mesh in size.

This application is a continuation-in-part of application Serial No. 548,246, filed November 21, 1955, now abandoned.

Although the invention has been described with reference to specific details of certain embodiments, it is not intended that the invention be construed as limited thereto except insofar as details are included in the appended claims.

We claim:

1. In the method of catalytically dehydrochlorinating symmetrical tetrachloroethane to trichloroethylene which comprises passing vaporized symmetrical tetrachloroethane through a dehydrochlorination catalyst-containing zone, said catalyst being capable of catalytically dehydrochlorinating tetrachloroethane, the improvement which comprises establishing a temperature of between 350° F. and 700° F. in said zone, correlating the rate at which tetrachloroethane is fed into the zone and the temperature therein to convert from between 50 to 85 percent tetrachloroethane to trichloroethylene, analyzing the product composition to determine the degree of conversion and in response to such analysis raising the zone temperature to maintain a 50 to 85 percent conversion throughout the reaction, separating unconverted tetrachloroethane from the product composition and recycling thusly separated tetrachloroethane to the catalyst-containing zone.

2. In the method of catalytically dehydrochlorinating symmetrical tetrachloroethane to trichloroethylene which comprises passing symmetrical tetrachloroethane through a dehydrochlorination catalyst-containing zone, said catalyst being capable of catalytically dehydrochlorinating tetrachloroethane, the improvement which comprises initially establishing a temperature of between 350° F. and 450° F. in said zone, correlating the rate at which tetrachloroethane is fed into the zone with the initial temperature to convert from between 50 and 85 percent of the tetrachloroethane to trichloroethylene, analyzing the product composition to determine the degree of conversion, in response to an analysis which indicates a conversion outside of the desired range, raising the zone temperature to maintain a 50 to 85 percent conversion, separating unconverted tetrachloroethane from the product composition and recycling thusly separated tetrachloroethane to the catalyst-containing zone, and repeating such temperature raise in response to the analyses until the temperature in the zone is from 675° F. to 725° F.

3. The method of claim 2 wherein the catalyst is carbon impregnated with barium chloride.

4. In the method of catalytically dehydrochlorinating symmetrical tetrachloroethane to trichloroethylene which comprises establishing an elongated tubular reaction zone containing a finely divided solid dehydrochlorination catalyst capable of catalytically dehydrochlorinating tetrachloroethane, the improvement which comprises initially establishing the temperature in said zone at 350° F. to 450° F., feeding tetrachloroethane into said zone at a rate correlated with the initial temperature such that from 50 to 85 percent thereof is converted to trichloroethylene, analyzing the product composition to determine the degree of conversion, in response to such analysis and when the conversion is below the specified range elevating the reaction zone temperature to maintain a 50 to 85 percent conversion while continuing the tetrachloroethane feed at substantially constant rate, and repeating such temperature raises in response to the analyses until the temperature in the zone is from 675° F. to 725° F., separating unconverted tetrachloroethane from the product composition and recycling thusly separated tetrachloroethane to the reaction zone.

5. In the method of catalytically dehydrochlorinating symmetrical tetrachloroethane to trichloroethylene which comprises passing symmetrical tetrachloroethane vapors through a zone containing a dehydrochlorination catalyst capable of catalytically dehydrochlorinating tetrachloroethane to trichloroethylene, the improvement which comprises establishing in said zone a dehydrochlorination temperature sufficient to convert between 50 and 85 percent of the tetrachloroethane to trichloroethylene, periodically analyzing the product composition to determine the degree of conversion of tetrachloroethane to trichloroethylene, and in response to such analyses, raising the temperature in the zone to maintain the tetrachloroethane conversion between 50 and 85 percent throughout substantially the entire period of catalytic dehydrochlorination of tetrachloroethane.

6. In the method of catalytically dehydrochlorinating symmetrical tetrachloroethane to trichloroethylene which comprises passing symmetrical tetrachloroethane vapors through a zone containing a dehydrochlorination catalyst capable of catalytically dehydrochlorinating tetrachloroethane to trichloroethylene, the improvement which comprises establishing both a pre-selected rate of feed of tetrachloroethane to the zone and a minimum dehydrochlorination temperature in said zone sufficient to convert between 50 and 85 percent of the tetrachloroethane to trichloroethylene, periodically analyzing the product composition to determine the degree of conversion of tetrachloroethane to trichloroethylene, in response to analyses which indicate a conversion below and outside the desired range, raising the temperature in the zone to maintain the tetrachloroethane conversion between 50 and 85 percent while continuing the tetrachloroethane feed at substantially constant rate and repeating such temperature raises until the zone temperature is from 675° F. to 725° F.

7. The method of claim 6 wherein the minimum temperature is 350° F. to 450° F.

8. The method of claim 6 wherein each temperature raise is 3° F. to 25° F.

9. The method of claim 6 wherein the catalyst is carbon impregnated with barium.

No references cited.